(12) United States Patent
Naganawa et al.

(10) Patent No.: US 8,354,769 B2
(45) Date of Patent: Jan. 15, 2013

(54) ROTATING ELECTRICAL MACHINE AND MANUFACTURING METHOD OF A STATOR THEREOF

(75) Inventors: Takashi Naganawa, Kasumigaura (JP); Takashi Ishigami, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 58 days.

(21) Appl. No.: 13/008,973

(22) Filed: Jan. 19, 2011

(65) Prior Publication Data
US 2011/0175485 A1 Jul. 21, 2011

(30) Foreign Application Priority Data
Jan. 19, 2010 (JP) .................................. 2010-009062

(51) Int. Cl.
*H02K 1/16* (2006.01)
*H02K 1/18* (2006.01)
*H02K 1/22* (2006.01)
*H02K 1/26* (2006.01)

(52) U.S. Cl. .................................. 310/216.077; 310/91

(58) Field of Classification Search ............ 310/216.091, 310/216.074, 216.077
See application file for complete search history.

(56) References Cited

U.S. PATENT DOCUMENTS

| | | | | |
|---|---|---|---|---|
| 713,604 A * | 11/1902 | Churchward | ........ | 310/216.077 |
| 919,458 A * | 4/1909 | Poth | ........ | 310/216.077 |
| 4,896,066 A * | 1/1990 | Tomite | ........ | 310/214 |
| 5,250,867 A * | 10/1993 | Gizaw | ........ | 310/179 |
| 6,137,201 A * | 10/2000 | Umeda et al. | ........ | 310/179 |
| 6,242,835 B1 * | 6/2001 | Uemura et al. | ........ | 310/214 |
| 6,664,696 B1 * | 12/2003 | Pham et al. | ........ | 310/216.106 |
| 6,742,238 B2 * | 6/2004 | Lee | ........ | 29/596 |
| 6,806,613 B2 * | 10/2004 | Ebihara et al. | ........ | 310/214 |
| 7,528,516 B2 * | 5/2009 | Mipo et al. | ........ | 310/187 |

FOREIGN PATENT DOCUMENTS

| | | |
|---|---|---|
| JP | 10-304609 | 11/1998 |
| JP | 2001-074461 | 3/2001 |

* cited by examiner

*Primary Examiner* — Tran Nguyen
(74) *Attorney, Agent, or Firm* — Antonelli, Terry, Stout & Kraus, LLP.

(57) ABSTRACT

A rotating electrical machine includes: a rotor to which a plurality of magnetic poles are provided along its circumferential direction; a stator core laminating a plurality of core plates, and having a cylinder portion with teeth extending radially outwards; and a stator coil received in a slot between the teeth; wherein each of the teeth includes: a tooth body portion extending radially outwards from the cylinder portion; and a pair of projecting end portions, provided at an end of the tooth body portion, that are in radially extended state before receiving the stator coil in the slot, and that are in curved state in which they are bent in circumferential direction after receiving the stator coil in the slot; and wherein, in the curved state, a vacant space is defined at the slot side of a curved portion that communicates the base portion and the projecting end portion.

11 Claims, 13 Drawing Sheets

ROTATING ELECTRICAL MACHINE AND MANUFACTURING METHOD OF A STATOR THEREOF

INCORPORATION BY REFERENCE

The disclosure of the following priority application is herein incorporated by reference: Japanese Patent Application No. 2010-009062, filed Jan. 19, 2010.

BACKGROUND OF THE INVENTION

1. Field of the Invention

The present invention relates to a rotating electrical machine such as a motor or a generator or the like, and to a method for manufacturing a stator of a rotating electrical machine.

2. Description of Related Art

As constructions for the coils to be employed for the stator of a rotating electrical machine, the concentrated winding format and the distributed winding format and so on are per se known. In the concentrated winding, a coil for one phase is wound upon a single core tooth, and therefore this has the advantage that it is possible to make the coils more compact, as compared with the case of a distributed winding. On the other hand, in the case of the distributed winding, a coil for one phase is subdivided into a plurality of coils and each subdivided coil is wound so as to straddle several core slots, and therefore this has the advantage that the electrical characteristics are better, as compared with the case of the concentrated winding. It should be understood that the coils are wound around the teeth with interposition of insulating material.

Furthermore, from the point of view of the positional relationship between the stator and the rotor, rotating electrical machines can broadly be divided into the inner-rotor type in which the rotor rotates in the interior of the stator, and the outer-rotor type in which the rotor rotates over the exterior of the stator. In the case of the inner-rotor type, in general, the rotor is linked to a main shaft that transmits rotation, while, in the case of the outer-rotor type, in general, the rotor is linked to or is integrated with a rotating element that is to be directly driven, or indirectly drives a rotating element via a gear wheel or the like.

For example, in the case of the outer-rotor type, a construction may be employed in which coils are installed into core slots from the exterior of the stator core. The stator core is fabricated by laminating a plurality of magnetic steel plates, and with such a stator core, it is desirable for the stator core to be of an integrated type from the viewpoint of reduction of iron loss; and moreover, from the viewpoint of reduction of copper loss in the coils, whichever of the concentrated winding and the distributed winding is employed as the coil winding method, it is desirable for the space factor of the coils in the slots to be high, by which the cross section of coil wires in each slot can be increased and therefore the coil resistance can be reduced.

With the technique described in Japanese Laid-Open Patent Publication H10-304609, in an outer-rotor type rotating electrical machine, in order to make the task of winding the coils upon the stator core simple and easy and in order to enhance the space factor, upon one of each pair of adjacent teeth, magnetic pole pieces are provided as projections that extend in the radial direction from both its sides at its end via thin link portions, and, after the coils have been wound, these thin link portions are bent around so that the magnetic pole pieces are displaced to extend in the circumferential direction. Furthermore, with the technique described in Japanese Laid-Open Patent Publication 2001-136701, it is arranged to provide projections on the ends of the teeth.

SUMMARY OF THE INVENTION

However, when the magnetic pole pieces that are shaped as projections in this way are being bent round to extend along the circumferential direction, it is easy for them to bulge outwards along the axial direction of the stator core, due to their base portions becoming creased. The stator core is made by laminating together magnetic steel plates, and, if creasing takes place in each of these magnetic steel plates and they bulge outwards in the axial direction, then the dimension of the stator core in its axial direction becomes larger, which is very undesirable, and this exerts a bad influence from the point of view of performance.

According to the 1st aspect of the present invention, a rotating electrical machine comprises: a rotor to which a plurality of magnetic poles are provided along its circumferential direction; a stator core constructed by laminating together a plurality of core plates, and having a cylinder portion and a plurality of teeth that extend outwards in the radial direction from the cylinder portion; and a stator coil received in a slot between the teeth; wherein each of the teeth comprises: a tooth body portion that extends radially outwards from the cylinder portion; and a pair of projecting end portions, provided at an end of the tooth body portion, that are in extended state so as to extend in radial direction before the stator coil is received in the slot, and that are in curved state in which they are bent around in circumferential direction after the stator coil is received in the slot; and wherein, in the curved state, a vacant space is defined at the slot side of a curved portion that communicates the tooth body portion and the projecting end portion.

According to the 2nd aspect of the present invention, in a rotating electrical machine according to the 1st aspect, it is preferred that the vacant space defined at the curved portions are communicated to the slot on its slot side.

According to the 3rd aspect of the present invention, in a rotating electrical machine according to the 1st aspect, it is preferred that, at the slot side of the vacant spaces defined at the curved portions, the projecting end portions and the tooth body portion are closely contacted together.

According to the 4th aspect of the present invention, in a rotating electrical machine according to any one of the aspects 1 through 3, it is preferred that the stator coil is installed, in the extended state, by inserting a coil-formed conducting wire into the tooth body portion from outside; and in the extended state, the projecting end portions has a width dimension in the circumferential direction smaller than a width dimension of the tooth body portion in the circumferential direction.

According to the 5th aspect of the present invention, in a rotating electrical machine according to the 4th aspect, it is preferred that the plurality of teeth extend radially outwards from outer circumference of the cylinder portion; and the stator core is formed in a cylindrical shape, and is disposed via a gap within an inner circumference of the rotor.

According to the 6th aspect of the present invention, a method of manufacturing a stator of a rotating electrical machine in which, after having installed a stator coil upon a tooth body portion that extends radially outward from a cylinder portion of a stator core, a pair of projecting end portions that are provided to extend in radial direction from the end of the tooth body portion are formed so as to be curved around in circumferential direction, and wherein: the pair of projecting end portions are curved so that, in their curved state, a vacant space is defined at the base portion of the projecting end portion.

According to the present invention it is possible to prevent the projecting end portions bulging outwards in the axial direction of the core plates during the process of bending the projecting end portions.

DESCRIPTION OF THE PREFERRED EMBODIMENTS

Figure 1:
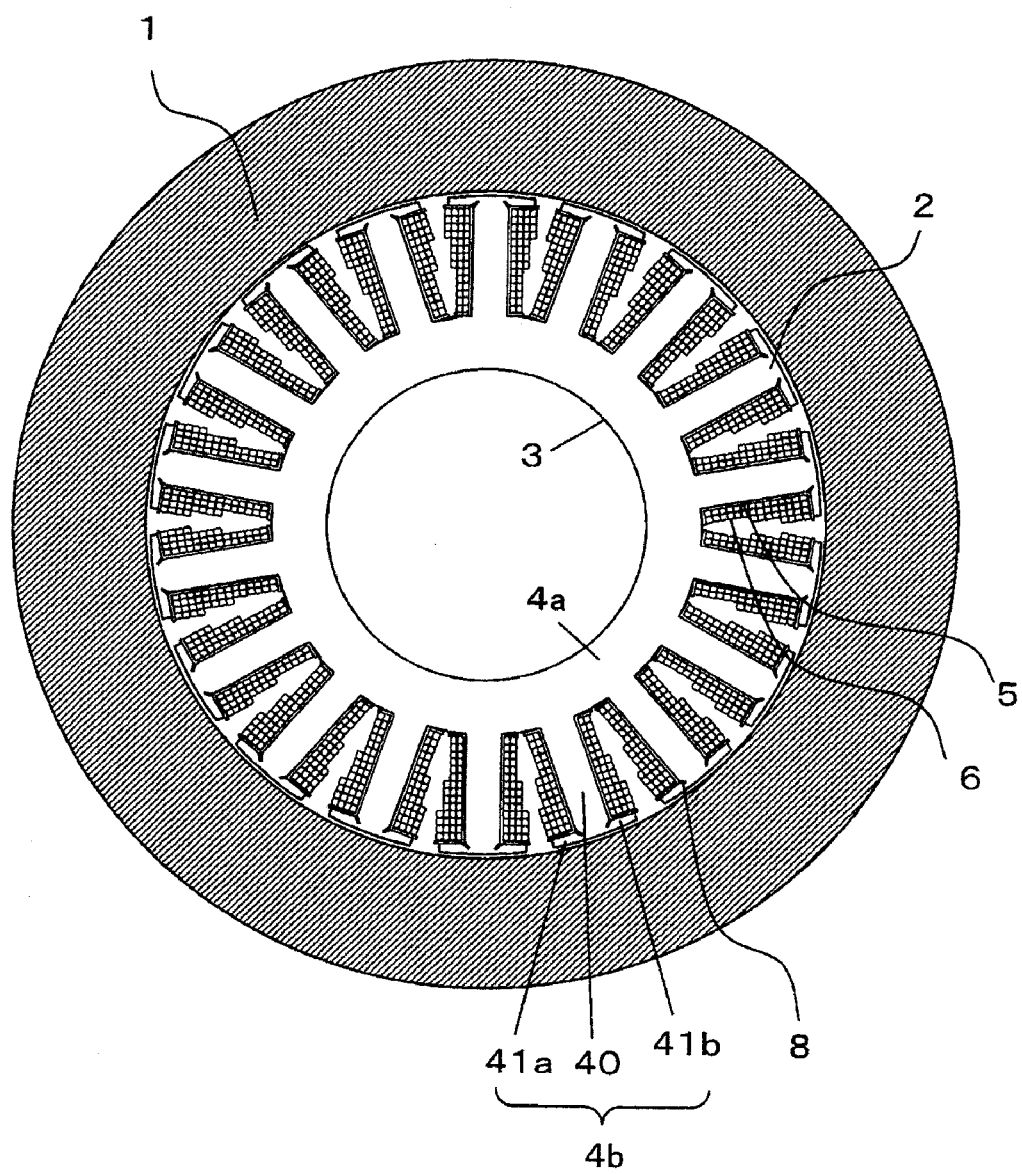
FIG. 1 is a sectional view showing the general structure of a rotating electrical machine according to the present invention.

In the following, an embodiment for implementation of the present invention will be explained with reference to the drawings. FIG. 1 is a sectional view showing the general structure of a rotating electrical machine according to the present invention. The rotating electrical machine shown in FIG. 1 is a rotating electrical machine of the outer-rotor type having a concentrated winding coil, with a rotor 1 being provided exterior to a stator 2, around its outer circumference. A core 3 of the stator 2 is made by laminating together elements (hereinafter termed "core plates") that are made by punching silicon steel sheet or the like.

A plurality of teeth 4b are provided on the outer circumference of a cylinder portion 4a of the core 3, and are spaced at regular intervals around its circumferential direction, while being formed so as to extend radially. A bobbin 5 made from an insulating material is fitted upon each of these teeth 4b, and a concentrated winding coil 6 is wound upon this bobbin 5. For example, conducting wire of a roughly rectangular cross section with an insulating cover layer may be used for this coil winding. As will be described hereinafter, with the rotating electrical machine of this embodiment, in order to make it easy to install the coils 6 upon the core 3, the bobbins 5 upon which the concentrated winding coils 6 are wound are made so as to be installed upon the teeth 4b from the outside of the core 3.

While in FIG. 1 no terminal wires are shown as being connected to the coils 6, actually an electric circuit is formed by connecting the neutral points of the coils which are respectively connected to terminal wires. And, while this is not shown in the figures, a plurality of permanent magnets, or a plurality of conducting rods of a squirrel-cage-shape made from for example copper, are installed coaxially in the interior of the rotor 1, and both ends of this rotor are rotatably supported by bearings, thus constituting an electric motor or a generator.

Figure 2:
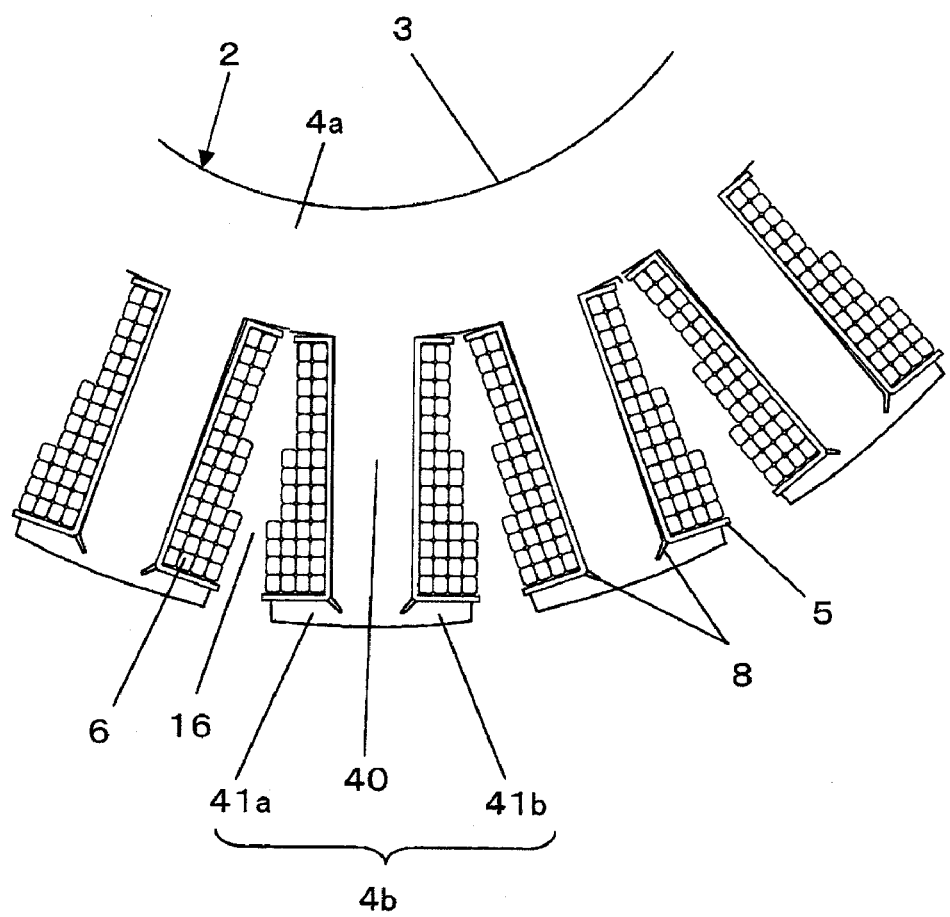
FIG. 2 is an enlarged view of a portion of a stator 2.

FIG. 2 is an enlarged view showing a portion of the stator 2. Each of the teeth 4b has a letter-T shape having a tooth body portion 40 upon which a coil 6 is installed and projecting end portions 41a and 41b, with vacant spaces 8 being formed at the bases of the projecting end portions 41a and 41b. Slots 16 are defined between the teeth 4b for receiving the coils 6. The feature of the vacant spaces 8 being provided at the bases of the projecting end portions 41a and 41b is a specific characteristic of the rotating electrical machine of this embodiment.

Figure 3:
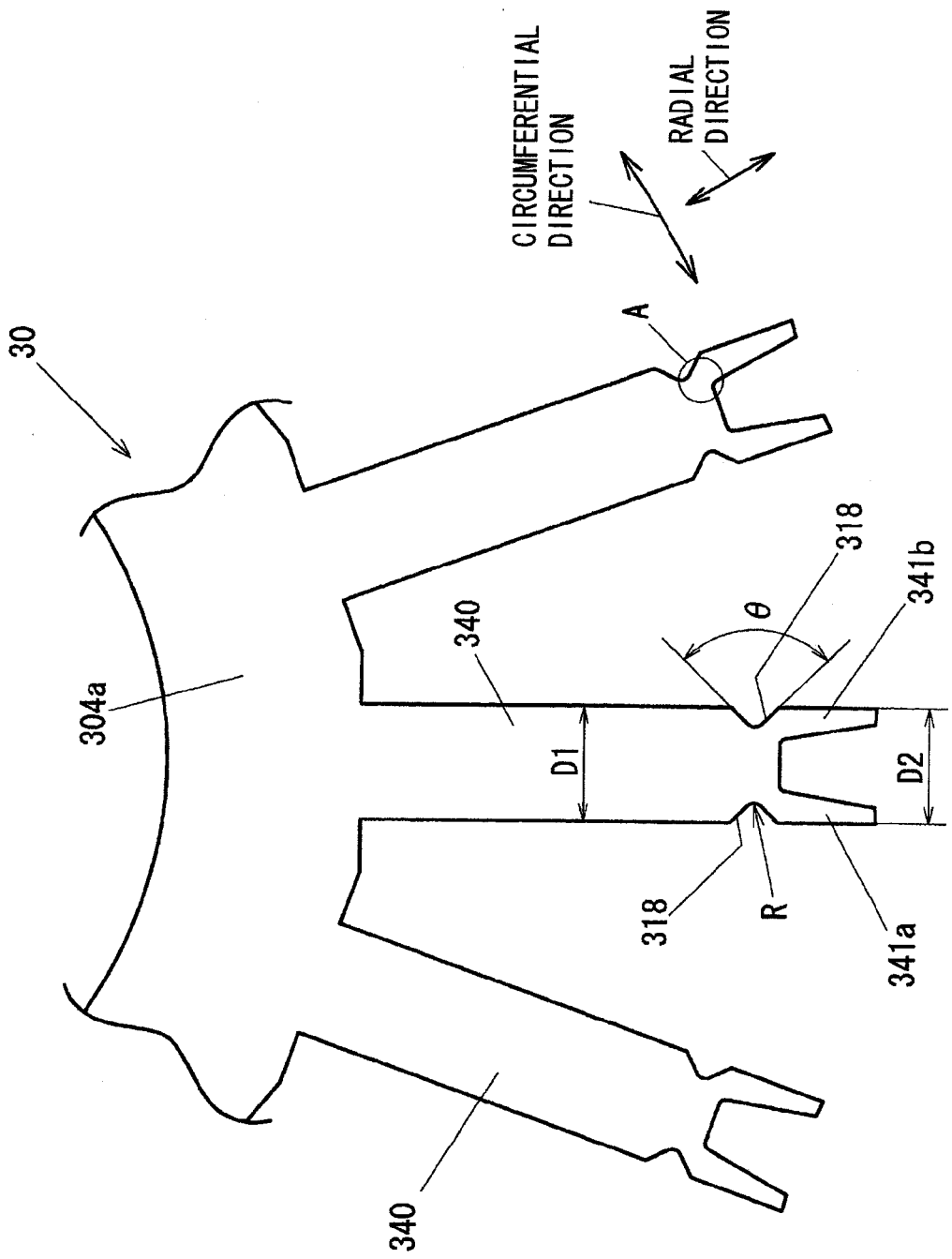
FIG. 3 is a figure showing a portion of one core plate 30.

FIG. 3 is a figure showing a portion of one of the core plates 30 that are laminated together to constitute the core 3. With the stator 2 in its completed state shown in FIGS. 1 and 2, the projecting end portions 41a and 41b of the teeth 4b extend in the circumferential direction so that they define letter-T shapes; but, at the stage of fabrication of the core plates 30, their projecting end portions 341a and 341b extend in the radial direction.

Cutaways 318 are formed in letter-V shapes at the base portions of the projecting end portions 341a and 341b of the core plate 30. The angle θ of these cutaways 318 is almost the same as the angle through which the projecting end portions 341a and 341b will be bent during the subsequent process of formation. The width dimension D2 of the portion at which the projecting end portions 341a and 341b are provided is set to be less than or equal to the width dimension D1 of the stem portion 340. Moreover, while the R dimension of the portions at the bottoms of the cutaways 318 depends upon the thickness of the core plate 30, if for example the plate thickness t=0.35 mm, this dimension may be at least R0.1 to R0.2. Even if the plate thickness is different, the ratio may be set to be almost similar.

The respective correspondences between the core plate 30 and the completed stator as a laminated body are that: the projecting end portions 341a and 341b correspond to the projecting end portions 41a and 41b; the annular portions 304a correspond to the cylinder portions 4a; the stem portions 340 correspond to the tooth body portions 40; and the cutaways 318 correspond to the letter-V shaped grooves 18 as will be described hereinafter.

FIGS. 4A through 11C are figures for explanation of the procedure for assembling this stator 2. Conducting wire 9 covered with an insulating layer is wound upon the bobbin 5 in advance, and in the process shown in FIG. 4A, in its state with the concentrated winding coil 6 wound upon it, the bobbin 5 is installed and fitted over the tooth 4b of the core 3 that has been made by laminating together the core plates 30. Thus, the tooth 4b is inserted into a through hole 5a formed in the bobbin 5. And the letter-V shaped grooves 18 are defined on the side surfaces of the tooth 4b in the circumferential direction, being built up from the cutaways 318 of the core plates 30.

Figure 5:
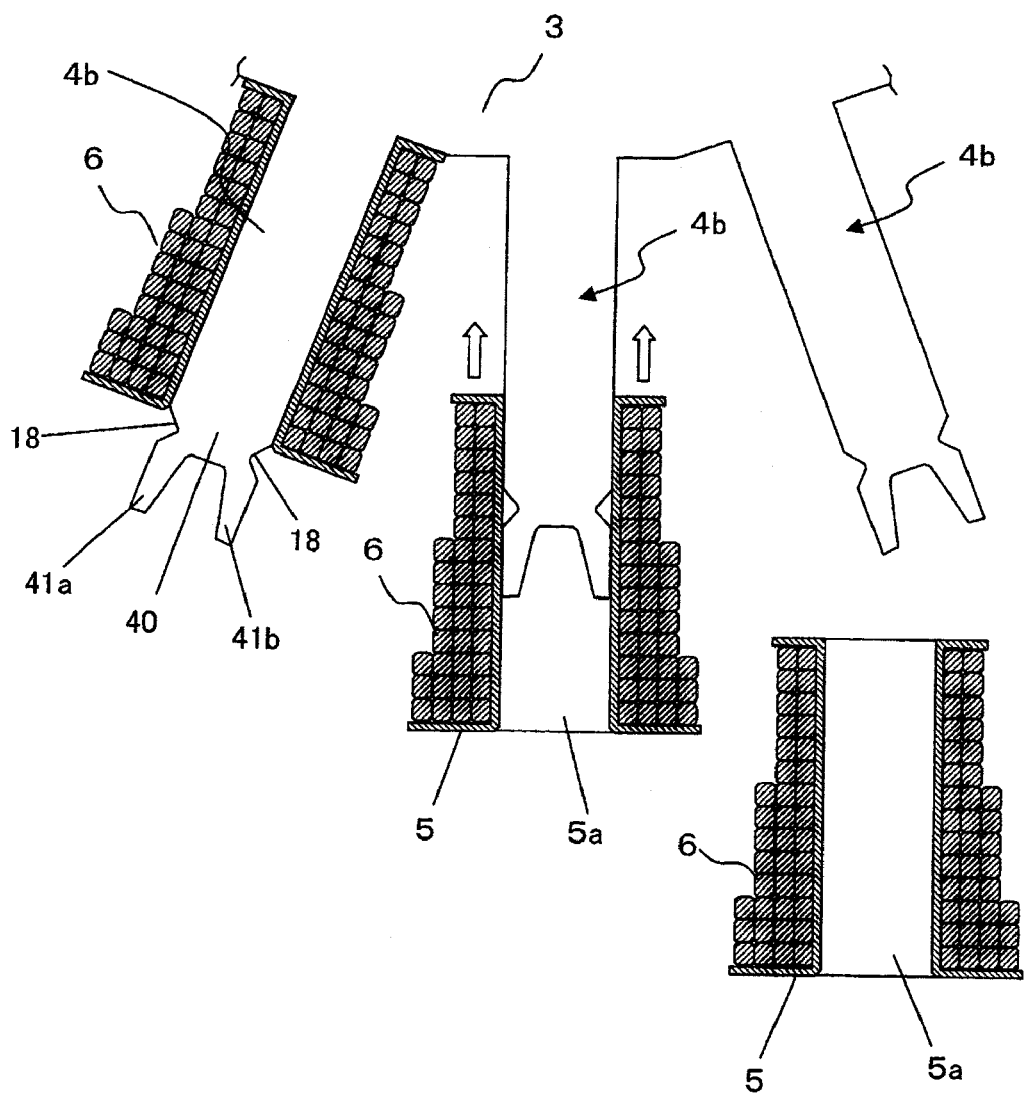
FIG. 5 is a figure showing a process for installing a bobbin 5.

FIG. 5 is a figure showing the process of installation of the bobbin 5: at its right side, it shows a state before installation of the bobbin 5 upon its tooth 4b; at its center it shows a state midway through the process of fitting the bobbin 5 over the tooth 4b; and at its left side it shows a state in which the installation of the bobbin 5 upon the tooth 4b has been completed. As shown in FIG. 3, the width dimension D2 of the portion where the projecting end portions 341a and 341b are formed is set to be less than or equal to the width dimension D1 of the stem portion 340 (i.e. of the tooth body portion 40 in FIG. 5). Due to this, i.e. by setting D2<D1, it becomes easy to perform the task of installing the bobbin 5.

Figure 4A:
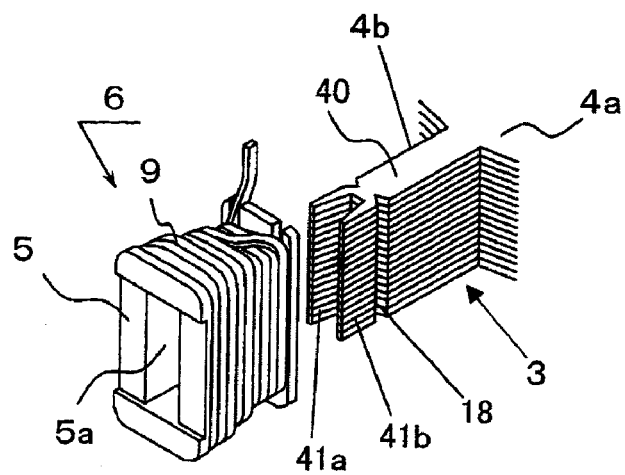
FIGS. 4A, 4B and 4C are the figures showing the order in which the stator 2 is assembled.
Figure 4B:
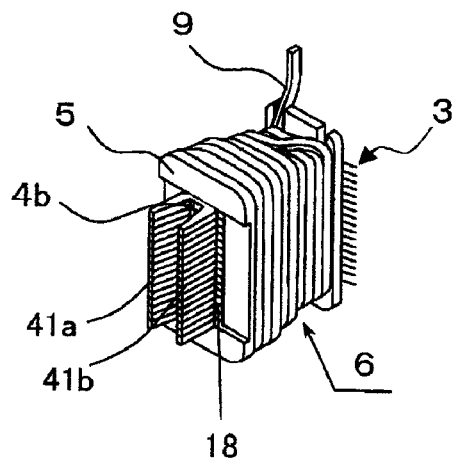
Figure 6:
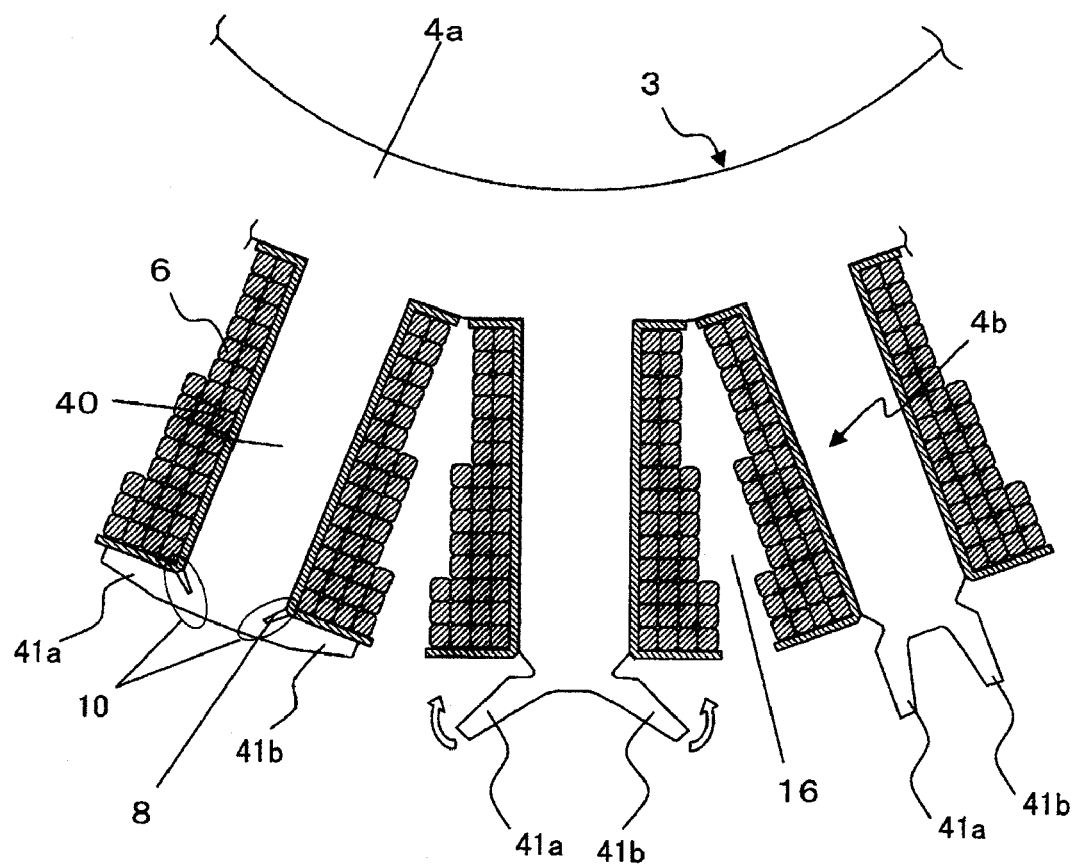
FIG. 6 is a figure showing a process for forming around projecting end portions 41a and 41b by bending them around.
Figure 7:
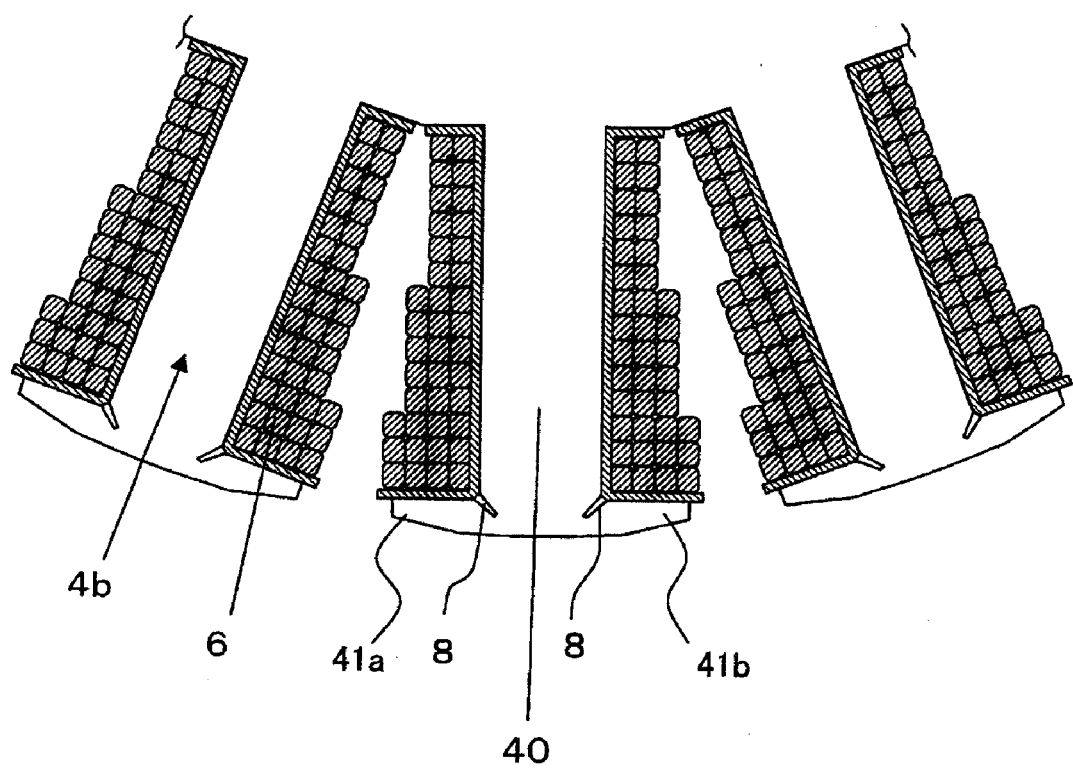
FIG. 7 is a figure showing shapes of the projecting end portions 41a and 41b after they have been bent around.

When the bobbin 5 is installed upon the tooth body portion 40 of the tooth 4b, as shown in FIGS. 4B and 5, the projecting end portions 41a and 41b project outwards from the bobbin 5. Next, as shown in FIG. 6, the projecting end portions 41a and 41b are formed by being bent around so that they extend in the circumferential direction. FIG. 7 is a figure showing the final shapes of the projecting end portions 41a and 41b after their formation has been completed.

Figure 8A:
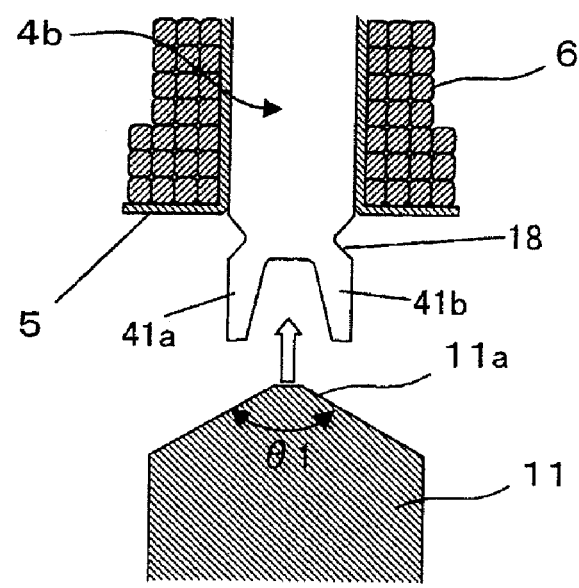
FIGS. 8A and 8B are the figures showing a process for formation of the projecting end portions 41a and 41b, using a punch 11.
Figure 8B:
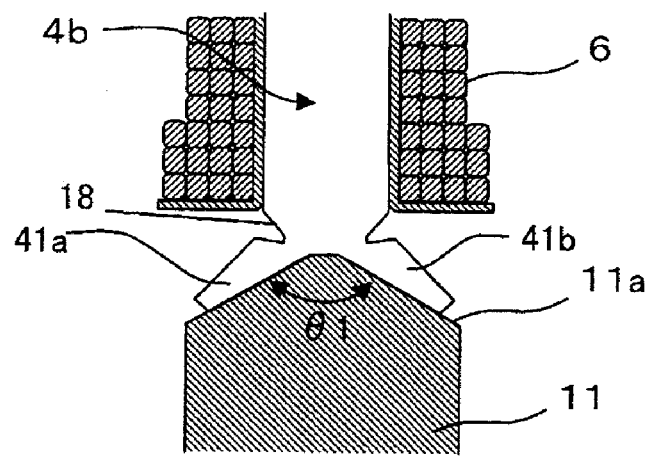
Figure 9A:
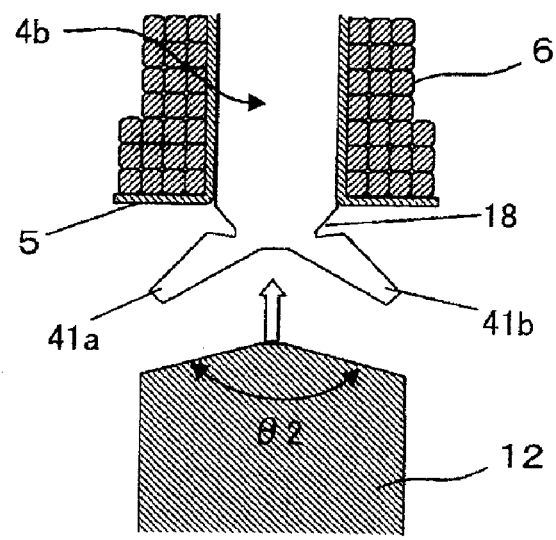
FIGS. 9A and 9B are the figures showing a further process for formation of the projecting end portions 41a and 41b, using a punch 12.
Figure 9B:
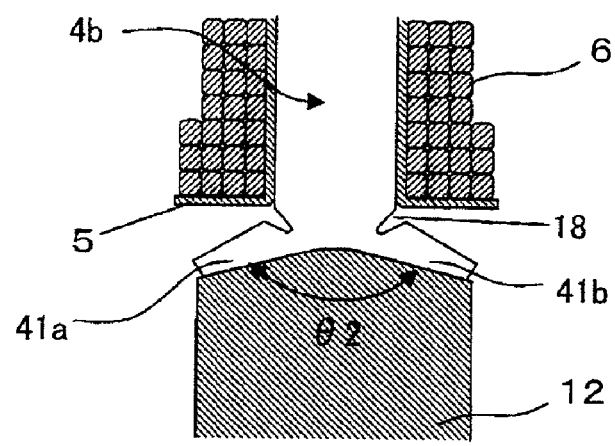
Figure 10A:
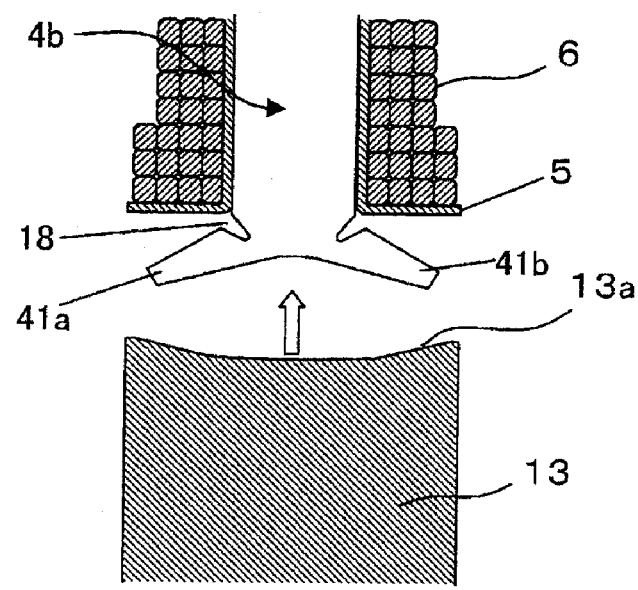
FIGS. 10A and 10B are the figures showing a yet further process for formation of the projecting end portions 41a and 41b, using a punch 13.
Figure 10B:
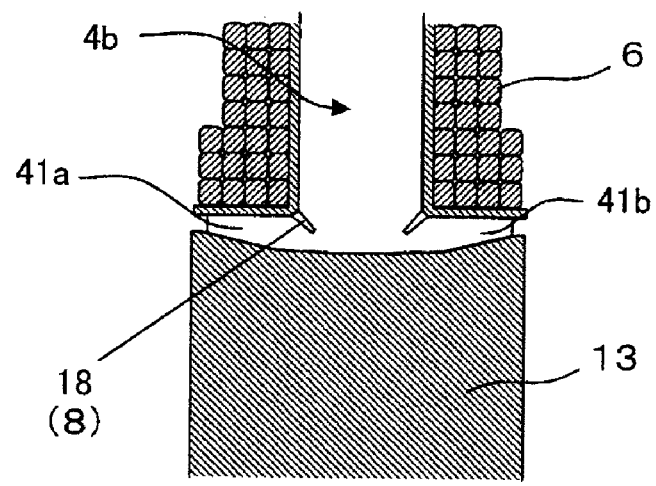

FIGS. 8A through 10B are figures showing a procedure for bending the projecting end portions 41a and 41b. Since the angle through which the projecting end portions 41a and 41b are to be bent is approximately 90°, i.e. is quite large, accordingly, in the example shown in FIGS. 8A through 10B, the projecting end portions 41a and 41b are not bent around in a single operation, but rather are separated and bent around in three stages by using formation punches 11 through 13 of three different types. The punches 11 and 12 shown in FIGS. 8A through 9B are formed with convex working surfaces 11a and 12a, while the punch 13 shown in FIGS. 10A and 10B is formed with a concave working surface 13a: this punch 13 is the punch that determines the final shapes of the projecting end portions 41a and 41b.

In the first step shown in FIGS. 8A and 8B, the punch 11 that has a surface 11a formed at an angle of θ1 is positioned radially outward from the tooth 4b, and then the punch 11 is shifted in the direction shown by the arrow sign, so that the projecting end portions 41a and 41b are deformed until they reach the shapes shown in FIG. 8B. Due to this formation process, the projecting end portions 41a and 41b are plastically deformed around their base portions as centers, and, along with their angle of opening becoming θ1, the gaps of their letter-V shaped grooves 18 are narrowed down.

Next, the formation punch 11 having the angle θ1 is exchanged for the punch 12 that has the angle θ2 (that is greater than θ1), and, as shown in FIG. 9B, the projecting end portions 41a and 41b are further processed. As a result, the angle of opening between the projecting end portions 41a and 41b becomes θ2, and also the gaps of their letter-V shaped grooves 18 are further narrowed down. Finally, as shown in FIGS. 10A and 10B, using the punch 13 that has the concave working surface 13a, the projecting end portions 41a and 41b are formed into their final shapes, in other words into shapes that extend along the circumferential direction.

Figure 4C:
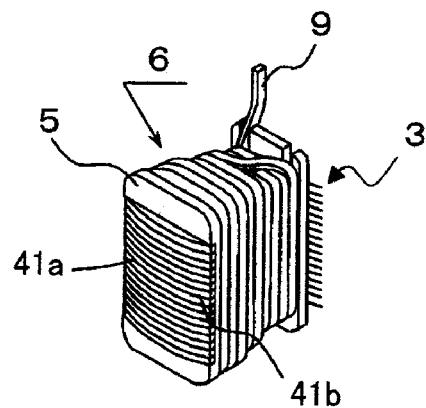

FIG. 4C shows the state in which the projecting end portions 41a and 41b have been formed into their final shapes, and in which the radially outer surfaces of the projecting end portions 41a and 41b that have been bent around to extend in the circumferential direction are formed into almost circular arcs. By directing the projecting end portions 41a and 41b along the circumferential direction in this manner, it is possible to reduce the magnetic flux losses, and this can contribute to an enhancement of efficiency. Moreover, as shown in FIG. 7, the shapes of the letter-V shaped grooves 18 at the base portions of the projecting end portions 41a and 41b are greatly deformed by the above described formation process, and are changed into long thin vacant spaces 8.

In the prior art, as described in FIG. 10 of Japanese Laid-Open Patent Publication H10-304609 and so on, the structure of a stator 2 that is made by forming the projecting end portions 41a and 41b after having installed the coils 6 upon the teeth 4b is such that, after the formation process, no vacant spaces are present at the base portions which correspond to the base portions of the present projecting end portions 41a and 41b. This is done in consideration of the flow of magnetic flux from the tooth body portions 40 of the teeth 4b to the projecting end portions 41a and 41b, since if such vacant spaces are present, the magnetic flux is easily saturated and flows out at the bottom potion of the vacant spaces, where the teeth is narrower, the performance of the rotating electrical machine decreases; and accordingly in the prior art, when forming the projecting end portions which correspond to the present projecting end portions 41a and 41b, the design ensures that the letter-V shaped grooves 18 close up completely and tightly, so that no gaps are defined.

As explained later, in the present invention, the gap sizes are carefully designed so that the magnetic flux saturation does not occur at the gaps.

Now, during the process of formation of the projecting end portions 41a and 41b, as shown in FIGS. 8A through 10B, the connecting portions between the projecting end portions 41a and 41b and the tooth body portion 40, in other words the portions that become thin where the letter-V shaped grooves 18 are formed (i.e. the portions shown in FIG. 3 by the reference symbol A) come to be plastically deformed. At this time, the material at the side where the letter-V shaped grooves 18 are formed (i.e. at the inside of the bending process) is compressed, while conversely, at the other side of the groove 18, the material becomes pulled out.

Figure 11A:
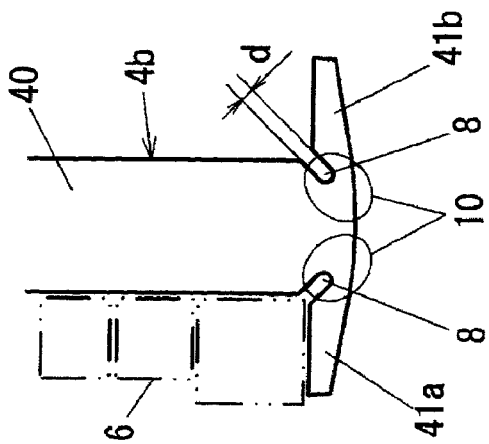
FIGS. 11A, 11B and 11C are the figures showing shapes for V-grooves 18 and vacant spaces 8.

On the other hand, as shown in Japanese Laid-Open Patent Publication H10-304609, in order to ensure that no vacant spaces 8 like those shown in FIG. 6 are formed, it is necessary for the bottom portions of the letter-V shaped grooves 18 that are defined upon the teeth 4b to define angles that are as sharp at their bottoms as possible, as shown in FIG. 11A. As a result, when the material on the inside of the bending process is compressed, due to this compression, the material flows and collects in the extremely narrow portion, so that the phenomenon of the core plate 30 bulging outwards in its thickness direction may take place. When bulging takes place due to the process of formation of each of the core plates 30 that are laminated together, the dimension in the axial direction of the end portions of the teeth becomes larger, so that, among various inconveniences, the performance is deteriorated, such as rotation balance deterioration.

Figure 11B:
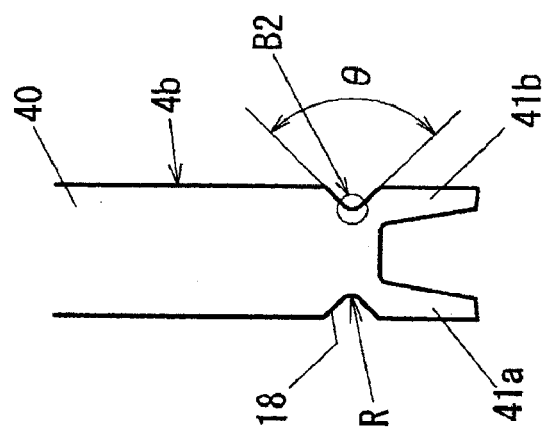

However in this embodiment, by making the R dimensions of the cutaways 318 shown in FIG. 3 large, it is possible to reduce or prevent bulging such as occurred in the prior art. In the example shown in FIG. 11A, since the R dimensions of the bottom portions of the letter-V shaped grooves 18 are extremely small, accordingly the flow of material can easily collect in these narrow regions due to compression, as shown by the reference symbol B1. On the other hand, when the R dimensions are made larger as shown in FIG. 11B, then it is possible to disperse the flow of material to these portions that are shaped in larger circular arcs (i.e. to the portions shown by the reference symbol B2), so that it is possible to reduce or prevent bulging of the material in the thickness direction of the core plates 30.

Figure 11C:
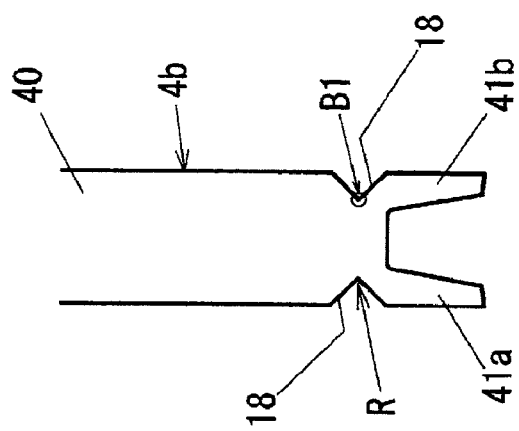

FIG. 11C is a figure showing the shapes of the projecting end portions 41a and 41b after they have been bent around. The regions denoted by the reference symbol 10 are the curved portions at the base of the projecting end portions 41a and 41b, and vacant spaces 8 are defined at the insides of these curved portions 10 (towards the coil 6). Compressive stress operates at the insides of the curved portions 10, and tension stress acts at the outsides of the curved portions 10. The vacant spaces 8 are long and narrow groove shaped spaces that are defined by the projecting end portions 41a and 41b being bent around, so that the angles θ of the letter-V shaped grooves 18 shown in FIG. 11B have become small. Due to this, the width dimension d of the grooves 8 after the bending around process becomes of the same order as the R dimension of the bottom portions of the letter-V shaped grooves 18.

To take a concrete example, in a case in which the thickness t is t=0.35 mm, the width D1 is D1=2 mm, and the core plates 30 are laminated together to form a core 3 of height 34 mm, if the R dimension of the letter-V shaped grooves 18 is made to be 0.2 mm, then the width dimension d of the vacant spaces 8 becomes 0.1 mm to 0.2 mm. The length of the vacant spaces 8 is 0.8 mm. If the gaps of the vacant spaces 8 are of this order, then it is possible for the magnetic flux to flow across the vacant spaces 8, and it is possible for the influence upon the magnetic flux to be made extremely small. It should be understood that the R dimension that is appropriate for bulging to be prevented also depends upon the thickness dimension of the core plates 30, and, according to the results of actually performing this bending process and analysis of the resulting deformation and so on, it is desirable to set the R dimension to at least 30% to 60% of the core plate thickness.

Figure 12A:
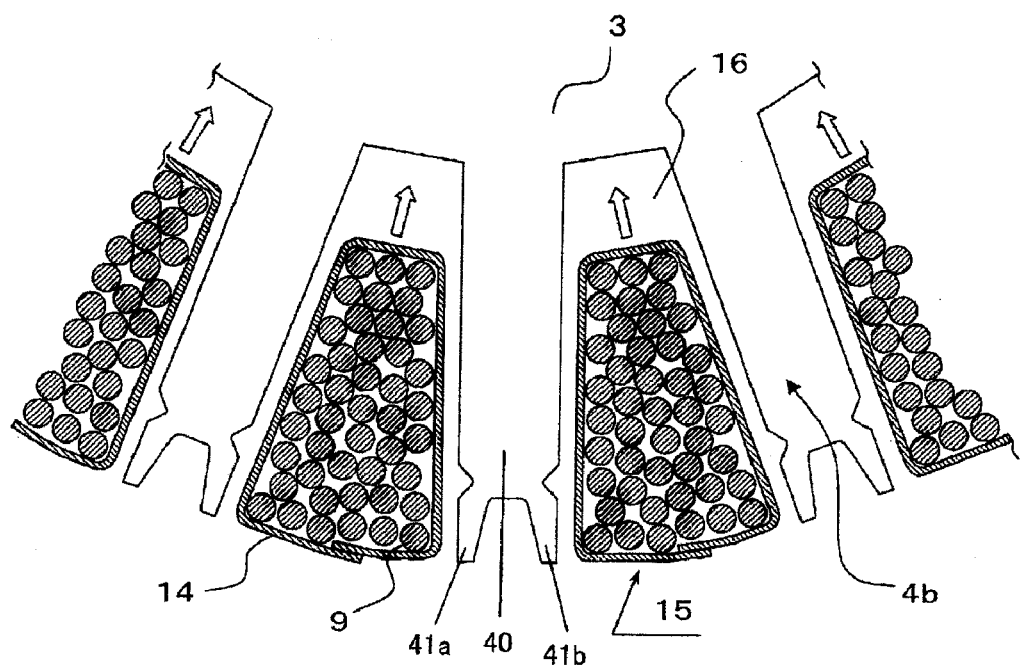
FIGS. 12A and 12B are the figures showing a case in which a distributed winding coils 15 are employed.
Figure 12B:
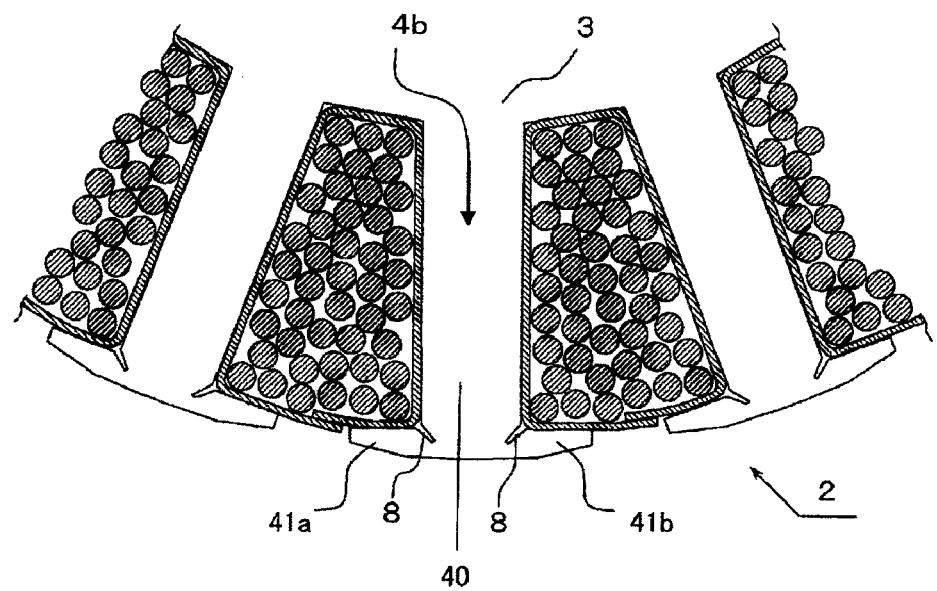

While in the embodiment described above the coil 6 was a concentrated winding coil, a case is shown in FIGS. 12A and 12B in which a distributed winding coil is used. As shown in FIGS. 12A and 12B, such a distributed winding coil may be formed by winding conducting wire covered with an insulating layer into a predetermined shape, and by covering it with an insulating layer 14. The distributed winding coil 15 that is thus formed is inserted into the slots 16 of the core 3. Next, the stator 2 is formed by processing the projecting end portions 41a and 41b of the teeth 4b. Moreover, although in the example described above the distributed winding coil 15 is inserted into the slots 16 after having been wound, the method of directly winding it upon the tooth body portions 40 of the teeth 4b would also be acceptable. Yet further, although in this embodiment a concentrated winding coil and a distributed winding coil have been described, coils wound in other ways could also be employed.

—A Variant Embodiment—

Figure 13A:
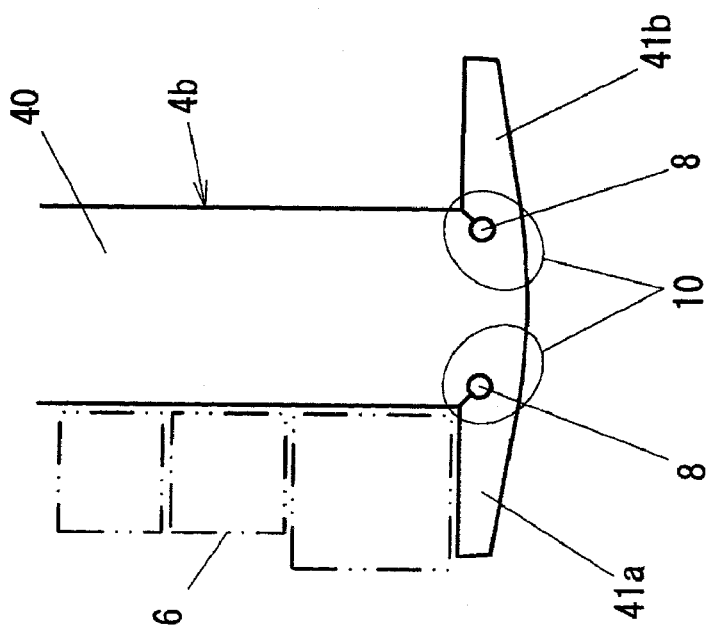
FIGS. 13A and 13B are the figures showing a variant embodiment.
Figure 13B:
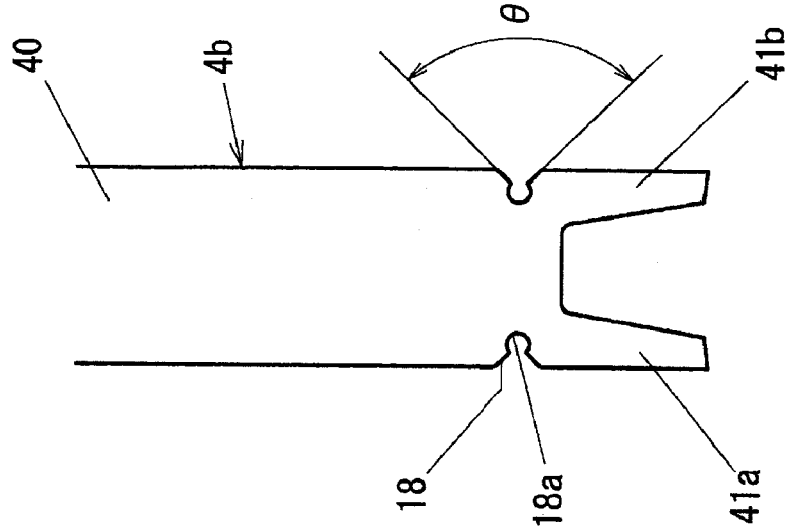

FIGS. 13A and 13B are figures showing a variant of the embodiment described above. In this variant embodiment as shown in FIG. 13A, it is arranged to form circular arcs 18a at the bottom portions of the letter-V grooves 18. FIG. 13B is a figure showing the shape after the bending process has been completed: the straight line portions of the letter-V grooves 18 are closely mutually closed together, and almost circular shaped vacant spaces 8 are defined. Conversely, the dimensions of the letter-V shaped grooves 18 and of the circular arcs 18a may be set so that the shapes after the bending process is completed become as shown in FIG. 13B. In this case as well, it is possible to prevent bulging of the core plates 30, since the flow of material is dispersed along the circular arcs 18a during the bending process. Furthermore there is also the advantageous aspect that, since the straight line portions of the letter-V grooves 18 are closed together after the formation process, accordingly the flow of magnetic flux becomes better, as compared to the case described above.

As described above, in this embodiment, the plurality of teeth 4b extend from the cylinder portion 4a of the stator core 3 in the radial direction, and the projecting end portions 41a and 41b are provided at its end so as to curve around. At the stage at which the stator coils 6 are to be housed in the slots 16, the projecting end portions 41a and 41b still have shapes that extend in the radial direction, and, after the stator coils 6 have been fitted into the slots 16, then the projecting end portions are bent around so as to extend in the circumferential direction, thus assuming a curved state in which they engage with the rotor side end surfaces of the stator coils 6. The structure is such that, in this curved state, vacant spaces 8 are created at the coil sides of the curved portions 10 to which the tooth body portion 40 and the projecting end portions 41a and 41b communicate, in other words at the base portions of the projecting end portions 41a and 41b. As a result, the flow of material during the bending process disperses along the edges of these vacant spaces 8, and it is possible to prevent bulging of the core plates out in the axial direction.

Since it is arranged to form vacant spaces 8 of this type, in the state before the bending process in which the projecting end portions 41a and 41b extend radially outwards from the tooth body portion 40, the wedge shaped grooves 18 are defined between the projecting end portions 41a and 41b and the tooth body portion 40, and the bottom portions of these grooves 18 are formed in rounded shapes, with the circular arcs 18a being formed as shown in FIGS. 13A and 13B so as to define smooth circular arcuate shapes.

It should be understood that although, in the embodiment described above, an example has been explained having a structure in which a coil that is wound in advance is fitted over the tooth body portion 40 having the tooth 4b, it would also be possible to apply the present invention to the case of a structure such as one in which, with the projecting end portions 41a and 41b in their original states in which they are shaped so as to extend in the radial direction, the coil is formed by wire material being wound upon the tooth 4b, and subsequently the projecting end portions 41a and 41b are bent over so as to extend in the circumferential direction. Furthermore, the present invention is not to be considered as being limited to an outer-rotor type electrical machine; it could also be applied to an inner-rotor type electrical machine having a structure in which the projecting end portions 41a and 41b are formed by being bent around in the circumferential direction after the coil has been installed to the stator core.

The embodiments described above may be employed singly or in combination. This is because it is possible to obtain the beneficial effect of each of the embodiments either singly or in synergy. Furthermore, the present invention is not to be considered as being limited by the embodiments described above in any way, provided that its specific characteristics are not lost.

What is claimed is:

1. A rotating electrical machine, comprising:
   a rotor to which a plurality of magnetic poles are provided along its circumferential direction;
   a stator core constructed by laminating together a plurality of core plates, and having a cylinder portion and a plurality of teeth that extend outwards in the radial direction from the cylinder portion; and
   a stator coil received in a slot between the teeth;
   wherein each of the teeth comprises:
      a tooth body portion that extends radially outwards from the cylinder portion; and
      a pair of projecting end portions, provided at an end of the tooth body portion, that are in extended state so as to extend in radial direction before the stator coil is received in the slot, and that are in curved state in which they are bent around in circumferential direction after the stator coil is received in the slot;
      and wherein, in the curved state, vacant spaces are defined at the slot sides of each curved portion that communicates with the tooth body portion and the projecting end portion, respectively;
      and wherein, the stator coil is in a state where a coil wire is wound around a bobbin of insulating material and is fitted upon the tooth body portion.

2. A rotating electrical machine according to claim 1, wherein the vacant space defined at the curved portions is communicated to the slot on the slot sides, respectively.

3. A rotating electrical machine according to claim 1, wherein, the vacant spaces defined by the slot of the respective curved portions are formed through closely bending together the projecting end portions and the tooth body portion.

4. A rotating electrical machine according to any one of claims 1 through 3, wherein:
the stator coil is installed, in the extended state, into the tooth body portion from outside; and
in the extended state, the pair of projecting end portions has a width dimension in the circumferential direction smaller than a width dimension of the tooth body portion in the circumferential direction.

5. A rotating electrical machine according to claim 4, wherein:
the plurality of teeth extend radially outwards from outer circumference of the cylinder portion; and
the stator core is formed in a cylindrical shape, and is disposed via a gap within an inner circumference of the rotor.

6. A method of manufacturing a stator of a rotating electrical machine, comprising:
a first step of installing a stator coil, which is in a state that a coil wire is wound around a bobbin of insulating material, with the bobbin of insulating material fitted upon a tooth body portion that extends radially outward from a cylinder portion of a stator core;
a second step following the first step of forming a pair of projecting end portions, which are provided to extend in radial direction from the end of the tooth body portion, so as to be curved around in circumferential direction;
wherein, in the second step,
the pair of projecting end portions are curved so that, in their curved state, vacant spaces are defined at base portions of the respective projecting end portion.

7. A rotating electrical machine according to claim 1, wherein the stator coil is shaped to have a trapezoidal form in cross section of radial direction on both sides of the bobbin in cross section of radial direction, in which a winding number of the coil wire increases from a base portion of the tooth body portion to the end of the tooth body portion.

8. A rotating electrical machine according to claim 2, wherein the stator coil is shaped to have a trapezoidal form in cross section of radial direction on both sides of the bobbin in cross section of radial direction, in which a winding number of the coil wire increases from a base portion of the tooth body portion to the end of the tooth body portion.

9. A rotating electrical machine according to claim 3, wherein the stator coil is shaped to have a trapezoidal form in cross section of radial direction on both sides of the bobbin in cross section of radial direction, in which a winding number of the coil wire increases from a base portion of the tooth body portion to the end of the tooth body portion.

10. A rotating electrical machine according to claim 4, wherein the stator coil is shaped to have a trapezoidal form in cross section of radial direction on both sides of the bobbin in cross section of radial direction, in which a winding number of the coil wire increases from a base portion of the tooth body portion to the end of the tooth body portion.

11. A rotating electrical machine according to claim 5, wherein the stator coil is shaped to have a trapezoidal form in cross section of radial direction on both sides of the bobbin in cross section of radial direction, in which a winding number of the coil wire increases from a base portion of the tooth body portion to the end of the tooth body portion.

* * * * *